United States Patent [19]

Shu

[11] Patent Number: 5,343,948

[45] Date of Patent: * Sep. 6, 1994

[54] SAND CONTROL AGENT AND PROCESS

[75] Inventor: Paul Shu, Cranbury, N.J.

[73] Assignee: Mobil Oil Corporation, Fairfax, Va.

[*] Notice: The portion of the term of this patent subsequent to May 18, 2010 has been disclaimed.

[21] Appl. No.: 63,200

[22] Filed: Aug. 16, 1993

Related U.S. Application Data

[62] Division of Ser. No. 810,468, Dec. 19, 1991, Pat. No. 5,211,236.

[51] Int. Cl.$^5$ ............................................ F21B 33/138
[52] U.S. Cl. ................................. 166/276; 166/292; 166/293; 166/300
[58] Field of Search ............... 166/276, 292, 293, 294, 166/295, 300

[56] References Cited

U.S. PATENT DOCUMENTS

| | | | |
|---|---|---|---|
| 3,012,405 | 12/1961 | Caron | 166/293 |
| 3,097,694 | 7/1963 | Kerver | 166/276 |
| 3,434,540 | 3/1969 | Stein | 166/250 |
| 3,708,013 | 1/1973 | Dismukes | 166/276 |
| 3,756,318 | 9/1973 | Stein et al. | 166/278 |
| 3,918,521 | 11/1975 | Snavely, Jr. et al. | 166/272 |
| 3,983,941 | 10/1976 | Fitch | 166/276 |
| 4,232,740 | 11/1980 | Park | 166/276 |
| 4,381,665 | 5/1983 | Levine et al. | 73/73 |
| 4,433,729 | 2/1984 | Sydansk | 166/270 |
| 4,440,227 | 4/1984 | Holmes | 166/261 |
| 4,479,894 | 10/1984 | Chen et al. | 252/855 |
| 4,489,783 | 12/1984 | Shu | 166/272 |
| 4,494,606 | 1/1985 | Sydansk | 166/295 |
| 4,513,821 | 4/1985 | Shu | 166/273 |
| 4,549,608 | 10/1985 | Stowe et al. | 166/280 |
| 4,669,542 | 6/1987 | Venkatesan | 166/258 |
| 4,785,883 | 11/1988 | Hoskin et al. | 166/270 |
| 4,945,991 | 8/1990 | Jones | 166/278 |

*Primary Examiner*—George A. Suchfield
*Attorney, Agent, or Firm*—Alexander J. McKillop; George W. Hager, Jr.; Charles A. Malone

[57] ABSTRACT

A method for forming a consolidated gravel pack in a washed-out interval is provided where a borehole penetrates an unconsolidated or loosely consolidated oil or gas reservoir which is likely to introduce substantial amounts of sand into the borehole. After perforating the borehole's casing at a washed-out interval of the formation, sand is introduced into the interval. Afterwards, an aqueous hydroxide solution is injected into said interval. Next, a spacer volume of a water-immiscible hydrocarbonaceous liquid slug is injected into the interval. Thereafter, a water-miscible organic solvent slug containing alkylpolysilicate is injected into the interval. A permeability retentive silica cement is formed in the interval thereby making a consolidated gravel pack. Injection of the aqueous hydroxide and alkylpolysilicate slugs is continued until silica cement has been deposited to an extent sufficient to exclude formation fines and sand.

11 Claims, 1 Drawing Sheet

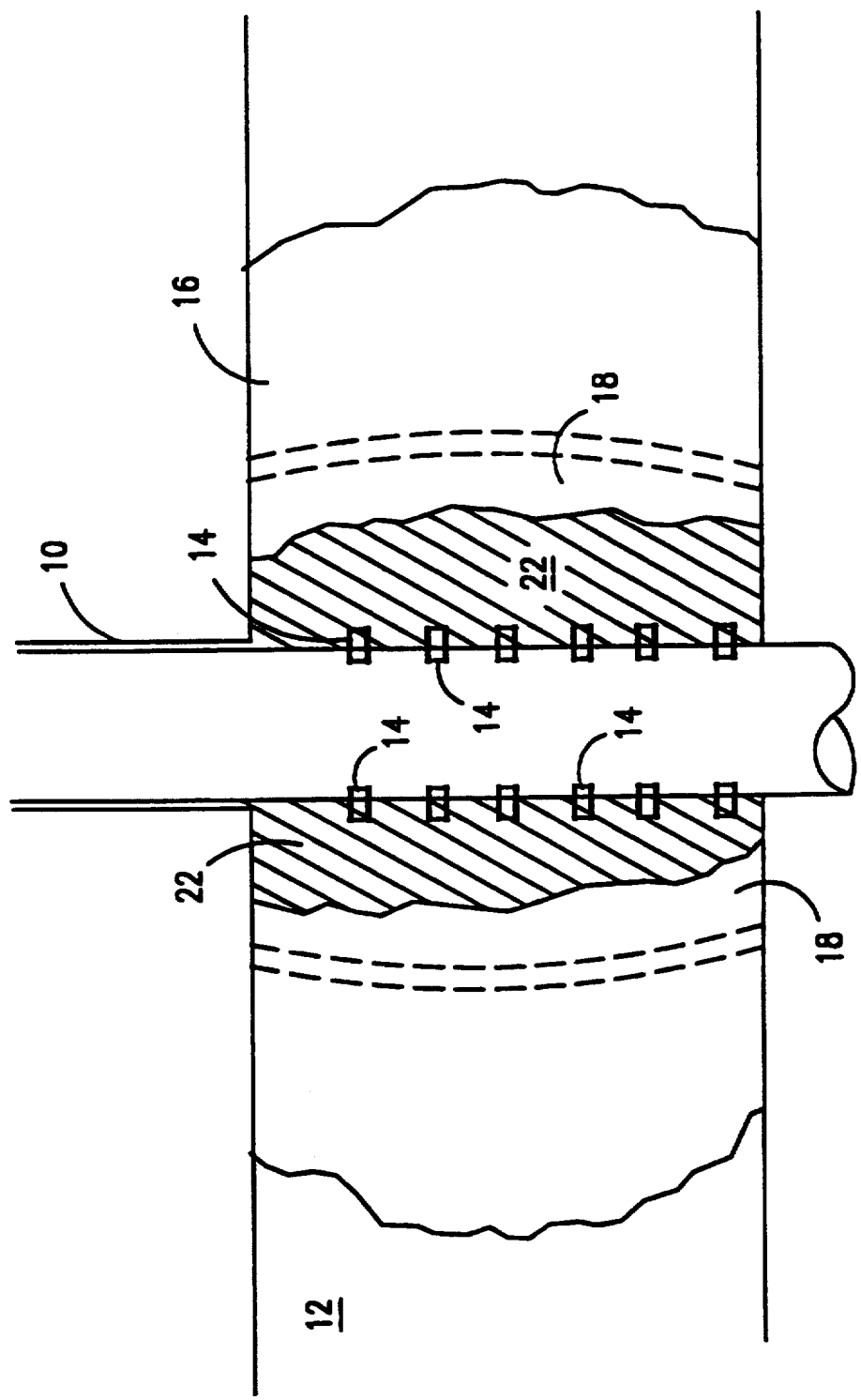

SAND CONTROL AGENT AND PROCESS

This is a division of copending application Ser. No. 07/810,468, filed on Dec. 19, 1991, now U.S. Pat. No. 5,211,235.

FIELD OF THE INVENTION

This invention relates to a method for making a gravel pack in a washed out interval of a formation where a silica cement is formed in-situ to minimize formation damage and prevent fines migration.

BACKGROUND OF THE INVENTION

Sand consolidation and gravel packing are two near wellbore techniques widely used for controlling the production of sand from producing wells such as oil wells, gas wells and similar boreholes. In many instances, highly porous and fragmentable sand formations surround a wellbore. Under production conditions, sand is often displaced from its aggregated structure and carried along by reservoir or injected fluids to a producing well. If sand flow is allowed to proceed unchecked, the producing wellbore soon becomes full of sand, thereby clogging the wellbore and impeding oil production. Furthermore, sand arriving at the surface site of the well erodes the production hardware.

As more and more sand is displaced from its original formation, a region of wash-out cavities surrounding the wellbore region results. As the wash-out zones become more extensive, the integrity of the wellbore is threatened and a danger of the wellbore collapsing exists.

It has therefore been the subject of extensive and intense research by the petroleum industry to develop techniques to minimize or obviate displacement of sand particles into producing well areas and prevent the formation of wash-out cavities surrounding the wellbore. One such general approach suggested by the art is to consolidate the sand structures prior to fluid production. Sand consolidation techniques are aimed at cementing loose sand structures adjacent to a wellbore. Such consolidation is effective to prevent breakdown of sand formation and subsequent clogging of producing wells.

In many loosely consolidated or unconsolidated formations, it is not economically or practically feasible to consider sand consolidation techniques. Also, there are many instances where substantial wash-out cavities are either initially present naturally near the wellbore, or washed-out cavities form around the wellbore after prolonged use despite previous attempts at sand consolidation.

For these conditions, gravel packing techniques are often used to prevent formation sand production or further erosion and to reestablish the integrity of the wellbore periphery. Gravel packing is the primary sand control technique involving the introduction of a fluid suspension of exogenous particulate matter downhole to fill the wash-out cavities or to "squeeze" a pack into the formation in the vicinity of the well. The term gravel is somewhat loosely applied in the art to encompass hard, rigid particulate matter ranging in size from a coarse sand to pebble size material.

Once the placement of sand and gravel has been accomplished, a slotted liner or "screen" placed as part of the production string helps hold the loose filling material and retards upstream sand flow through the filler material during production conditions.

Gravel packing can be accomplished by several accepted methods. One method is to place a gravel pack in the well adjacent to the entire portion of the formation exposed to the well to form a gravel filter. In a cased perforated well, the gravel may be placed inside the casing adjacent to the perforations to form an inside-the-casing gravel pack or may be placed outside the casing and adjacent to the formation or may be placed both inside and outside the casing. Various such conventional gravel packing techniques are described in U.S. Pat. Nos. 3,434,540; 3,708,013; 3,756,318; and 3,983,941. These patents are incorporated by reference herein. Such conventional gravel packing techniques have generally been successful in controlling the flow of sand from the formation into the well. Sometimes, however, the gravel pack is unable to prevent fines migration which necessitates costly workovers to be initiated.

Therefore, what is needed is a method to prevent fines migration through a gravel pack so as to prevent costly workovers.

SUMMARY OF THE INVENTION

This invention is directed to a method for controlling sand production in an unconsolidated or loosely consolidated oil or hydrocarbonaceous fluid containing formation or reservoir which is penetrated by at least one wellbore. A gravel packing operation is conducted so as to prevent caving of a washed-out area around said wellbore. Once the gravel packing sand has been placed into the caved out area adjacent the wellbore in the formation, a silica cement is formed in-situ so as to reduce the permeability of the gravel pack sand as little as possible while consolidating said pack and area substantially near the wellbore.

In the practice of this invention, an aqueous hydroxide solution is injected into an interval of the formation containing the gravel pack sand. The hydroxide which is used is a member selected from the group consisting of an alkali metal hydroxide, organoammonium hydroxide, or ammonium hydroxide. The aqueous hydroxide solution enters the interval through perforations made in a cased well penetrating the formation. By use of a mechanical packer, or other means, e.g. size selective gel, penetration of the fluid into the interval can be controlled. As the aqueous hydroxide solution enters the interval, it saturates said interval.

Once the interval is saturated with the hydroxide solution, a spacer volume of a water-immiscible hydrocarbonaceous liquid is directed into the washed-out interval. Hydrocarbonaceous liquids for use herein comprise paraffinic and aromatic liquids. Paraffinic liquids are preferred. Preferred paraffinic liquids are selected from a member of the group consisting of mineral oils, naphthas, $C_5$–$C_{40}$ alkanes, and mixtures thereof.

After a desired spacer volume of hydrocarbonaceous fluid has been placed into the interval requiring sand control, a water-miscible organic solvent containing an alkylpolysilicate is next injected into the interval. Upon coming into contact with the aqueous hydroxide solution which remains on the sand grains and between the sand grain contact points, alkylpolysilicate reacts with the aqueous hydroxide solution to form silica cement in-situ. The silica cement which is formed is stable at pH's equal to or less than about 7, and temperatures up to and in excess of about 1,000° C. (1,832° F.). These steps can be repeated until fines migration is controlled. Thereafter, production is commenced and substantially fines free hydrocarbonaceous fluids are produced to the surface.

By controlling the strength and rate of injection of the aqueous hydroxide and solvent containing the alkylpolysilicate which are injected into the interval being treated, the permeability, porosity and consolidation strength of the gravel pack sand and formation can be tailored as desired.

It is therefore an object of this invention to provide for an in-situ silica cement composition so as to exclude fines and sand from produced hydrocarbonaceous fluids which composition is more natural to a formation's environment.

It is another object of this invention to provide for a composition which will ensure an even flow front, a homogeneous consolidation and uniform porosity so as to substantially exclude the entry of formation fines and sand into a wellbore from an interval treated with said composition.

It is yet another object of this invention to consolidate an unconsolidated or loosely consolidated interval in a formation containing gravel pack sand so as to exclude formation fines or sand.

It is a still yet further object of this invention to provide for a method to obtain a desired permeability within an interval of a formation containing gravel pack sand which can be reversed by treating the interval with a strong alkali.

It is an even still yet further object of this invention to provide for a formation consolidation which is resistant to water, high temperatures and low pH's so that the formed gravel pack can be used with enhanced oil recovery (EOR) operations.

It is yet an even still further object of this invention to provide for a consolidation composition lacking a particulate matter therein so as to allow penetration of the composition into an area requiring consolidation.

It is a still even yet further object of this invention to provide for a simple consolidation composition and method which can tolerate water, residual oil and fines.

BRIEF DESCRIPTION OF THE DRAWING

The drawing is a schematic representation showing how the composition is injected into the formation so as to consolidate sand grains while maintaining the porosity of the formation.

DESCRIPTION OF THE PREFERRED EMBODIMENT

In the practice of this invention, sand, preferably gravel packing sand, is directed into a washed out area adjacent to a wellbore that penetrates a hydrocarbonaceous fluid producing zone. The washed out area extends circumferentially from the wellbore into the formation which causes an increased possibility that the wellbore will collapse. Gravel is placed into the washed out area by directing sand through perforations in a casing until the washed out area is filled with the sand. A method which can be used for gravel packing a well is discussed in U.S. Pat. No. 4,945,991 which issued to Jones on Aug. 7, 1990. This patent is hereby incorporated by reference herein.

After the washed-out area has been packed by sand, sand is consolidated by forming a silica cement in-situ while a desired permeability is retained in the sand within the consolidated washed out area. A silica cement is formed and binds sand within the washed out area which is sufficient to preclude formation fines or sand from being produced to the surface along with hydrocarbonaceous fluids. As is known by those skilled in the art, core samples taken from the formation containing the washed-out area can be used to determine the extent to which the agent must be applied. A method for determining the saturation characteristics of a porous material is disclosed in U.S. Pat. No. 4,381,665 which issued to Levine et al. on May 3, 1983. This patent is hereby incorporated by reference herein.

In order to form the silica cement, as shown in the drawing, an aqueous hydroxide slug is injected into well 10 where it enters formation 12 via perforations 14. As the aqueous hydroxide slug proceeds through formation 12, it saturates the sand-packed area and near wellbore area of the formation. After saturating the sand-packed area with the aqueous hydroxide solution selected from a member of the group consisting of an organoammonium hydroxide, ammonium hydroxide or alkali metal hydroxide, a spacer volume of a water-immiscible hydrocarbonaceous liquid 16 is next injected into the sand-packed area. Hydrocarbonaceous liquids for use herein comprise paraffinic and aromatic liquids. Paraffinic liquids are preferred.

This spacer volume of water-immiscible hydrocarbonaceous liquid is selected from a member of the group consisting of mineral oils, naphthas, $C_5$–$C_{40}$ alkanes, and mixtures thereof. The water-immiscible hydrocarbonaceous fluid used as a spacer volume may be of an industrial grade. Utilization of the spacer volume should be kept to a minimum in order to keep as much of the organoammonium hydroxide, alkali metal or ammonium hydroxide as possible in spaces between the sand grains in the formation. By keeping the maximum amount of said hydroxide between sand grains, a stronger and more imperious silica cement will be formed. A spacer volume of the hydrocarbonaceous liquid is used to remove excess hydroxide from between the sand grains while allowing a thin hydroxide film to remain on the surface to obtain a subsequent cementing reaction with an injected alkylpolysilicate solution.

Afterwards, a slug containing a water-miscible organic solvent with an alkylpolysilicate 18 mixed therein is injected into the formation whereupon it displaces any spacer volume of solution remaining therein. The water-miscible organic solvent is selected from a member of the group consisting of methanol, ethanol, higher alcohols, glycols, ketones, tetrahydrofuran, and dimethyl sulfoxide. This organic solvent can be of an industrial grade. As the aqueous hydroxide solution and the alkylpolysilicate meet, they react simultaneously to form a silica cement between the sand grains. The cementing reaction takes place so as to bind sand grains in the formation thereby forming a consolidated porous zone 22. Although the sand grains are consolidated, a porous cement is formed which results in a substantially high retention of the formation's permeability. Retention of the formation's permeability allows alkylpolysilicate slug 18 to move continually through the formation while cement is being formed between sand grains.

Injection of the alkali metal hydroxide slug, spacer volume 16 and alkylpolysilicate slug 18 containing alkylpolysilicate can be continued until enough cement has been formed to exclude formation fines and sand. As will be understood by those skilled in the art, this amount of cement is formation dependent and may vary from formation to formation. Core samples obtained from the interval to be treated can be tested to determine the required amount of cement. U.S. Pat. No. 4,549,608 which issued to Stowe et al. teaches a method of sand control where clay particles are stabilized along the face of a fracture. This patent is incorporated by reference herein.

In order to increase the cement's consolidation strength, the concentration of the organoammonium hydroxide, alkali metal hydroxide or ammonium hydroxide contained in an aqueous solution slug or the alkylpolysilicate contained in the solvent slug can be increased. Similarly, the flow rates of each of these slugs through the higher permeability zone can be decreased to obtain better consolidation strength. A decreased flow rate is particularly beneficial for increasing the consolidation strength when the alkylpolysilicate slug's flow rate is decreased. As will be understood by those skilled in the art, optimal concentrations and flow rates are formation dependent. Therefore, optimal concentrations and flow rates should be geared to field conditions and requirements.

Organoammonium hydroxides which can be used in an aqueous solution include those having $C_1$ through $C_{10}$ alkyl or aryl groups, including those with other hetero atoms. Tetramethylammonium hydroxide is preferred.

The alkali metal hydroxide which is utilized herein comprises sodium, potassium, or lithium. Sodium and potassium are the preferred alkali metal hydroxides for use herein. Sodium hydroxide is most preferred. The concentration of the alkali metal hydroxide solution, organoammonium hydroxide, or ammonium hydroxide is about 20 to about 60 wt. percent, preferably about 30 wt. percent. As will be understood by those skilled in the art, the exact concentration should be determined for each application. In general, concentrated hydroxide solutions result in greater permeability reduction due to higher contents of solids which form in the consolidated washed-out area.

Alkylpolysilicate (EPS) contained in the organic solvent solution is the hydrolysis-condensation product of alkylorthosilicate according to the reaction equation below:

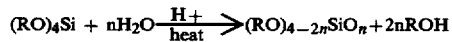

where $n \leq 2$
$R = C_1-C_{10}$
R should be $\leq 10$ carbons for good solubility and high $SiO_2$ content.

Tetramethyl (TMS) or tetraethylorthosilicates (TEOS) are preferred. Mixed alkylorthosilicate can also be used. It is desirable to obtain an alkylpolysilicate with $n > 0.5$, preferably n greater than 1. As n increases, the $SiO_2$ content increases, resulting in stronger consolidation. It is desirable to use an alkylpolysilicate with a silica content of 30% or more, preferably about 50 wt. %. EPS which is used herein is placed into one of the water-miscible organic solvents mentioned above. The preferred solvent is ethanol. Of course, other alcohols can be used. EPS, TMS, TEOS, or other alkylpolysilicates are contained in the solvent in an amount of from about 10 to about 100 weight percent sufficient to react with the hydroxide contained in the aqueous solution. Twenty (20) to about eighty (80) wt. percent is preferred. Although alcohol is the solvent preferred because of its versatility and availability, other water-miscible organic solvents can be utilized. These solvents, as previously mentioned, include methanol and higher alcohols, glycols, ketones, tetrahydrofuran, and dimethyl sulfoxide.

The viscosity of the silicate in the solvent can also determine the extent to which it will enter a higher permeability zone. In those cases where it is not possible to control the viscosity of the silicate contained in the solvent and preclude entry into a lower permeability zone, a mechanical packer may be used. The silica cement which is formed can withstand pH's less than about 7 and temperatures up to and in excess of about 1,000° C. (1,832° F.).

Once enough cement has been formed to exclude formation fines, hydrocarbonaceous fluids can be produced from formation 12 into well 10. Alternatively, an enhanced oil recovery (EOR) process can be instituted in formation 12 via well 10. EOR processes which can be utilized include steam-flooding, water-flooding, carbon dioxide stimulation and fire-flooding.

Steam-flooding processes which can be utilized when employing this cemented gravel-pack described herein are detailed in U.S. Pat. Nos. 4,489,783 and 3,918,521 which issued to Shu and Snavely, respectively. U.S. Pat. No. 4,479,894 that issued to Chen et al. describes a water-flooding process which may be used herein. Fire-flooding processes which can be utilized herein are disclosed in U.S. Pat. Nos. 4,440,227 and 4,669,542 which issued to Holmes and Venkatesan, respectively. These patents are hereby incorporated by reference herein.

A carbon dioxide EOR process which can be used after forming the gravel pack is disclosed in U.S. Pat. No. 4,513,821 which issued to W. R. Shu on Apr. 30, 1985. This patent is hereby incorporated by reference herein.

Although the present invention has been described with preferred embodiments, it is to be understood that variations and modifications may be resorted to without departing from the spirit and scope of this invention, as those skilled in the art readily understand. Such variations and modifications are considered to be within the purview and scope of the appended claims.

What is claimed:

1. A method for forming a cement for controlling sand production through a consolidated gravel pack in an unconsolidated or loosely consolidated formation penetrated by a cased borehole where sand is placed within a washed-out area adjacent said borehole, comprising the steps of:

a) injecting into said zone an aqueous hydroxide solution where the hydroxide is a member selected from the group consisting of an alkali metal hydroxide, ammonium hydroxide, or organoammonium hydroxide;

b) injecting next into said zone a spacer volume of a water-immiscible hydrocarbonaceous liquid; and c) injecting thereafter a water-miscible organic solvent containing an alkylpolysilicate in an amount sufficient to react with said aqueous hydroxide solution so as to form a permeability retentive silica cement within said sand in a washed-out area which cement is of a strength sufficient to bind sand containing particles within the washed-out area and formation adjacent thereto while producing hydrocarbonaceous fluids and excluding formation fines or sand.

2. The cement as recited in claim 1 where the aqueous hydroxide solution comprises ions of sodium, potassium, or lithium, and mixtures thereof.

3. The cement as recited in claim 1 where in step c) the solvent is a member selected from the group consisting of methanol, ethanol, higher alcohols, glycols, ketones, tetrahydrofuran, and dimethyl sulfoxide.

4. The cement as recited in claim 1 where in step c) the hydroxide is contained in the aqueous solution in an amount of from about 20 to about 60 weight percent.

5. The cement as recited in claim 1 where alkylpolysilicate is contained in said solvent in an amount of about 10 to about 90 weight percent.

6. The cement as recited in claim 1 where said silica cement withstands temperatures in excess of about 1,000° C. (1,832° F.).

7. The cement as recited in claim 1 where the silica cement withstands pH's of 7 or lower.

8. The cement as recited in claim 1 where in step c) said alkylpolysilicate is the hydrolysis condensation product of alkylorthosilicate according to the equation:

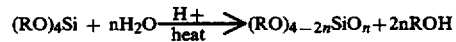

where $n \leqq 2$ and $R = C_1 - C_{10}$

9. The cement as recited in claim 1 where in step b) the spacer volume of fluid is a member selected from the group consisting of mineral oils, naphthas, $C_5-C_{40}$ alkanes, and mixtures thereof.

10. The cement as recited in claim 1 where in step a) said organoammonium hydroxide is selected from a member of the group consisting of $C_1$ through $C_{10}$ alkyl or aryl groups and hetero atoms.

11. The cement as recited in claim 1 where in step a) said organoammonium hydroxide is tetramethylammonium hydroxide.

* * * * *

UNITED STATES PATENT AND TRADEMARK OFFICE
CERTIFICATE OF CORRECTION

PATENT NO. : 5,343,948
DATED : September 6, 1994
INVENTOR(S) : Paul Shu

It is certified that error appears in the above-indentified patent and that said Letters Patent is hereby corrected as shown below:

On the title page, item [22] Filed, "August 16, 1993" should read --May 18, 1993--.

Signed and Sealed this

Sixteenth Day of May, 1995

Attest:

BRUCE LEHMAN

*Attesting Officer*  *Commissioner of Patents and Trademarks*